Patented Apr. 5, 1932

1,852,043

UNITED STATES PATENT OFFICE

MAX DESENISS AND ANDREAS NIELSEN, OF HAMBURG, GERMANY, ASSIGNORS TO THE NEW-YORK HAMBURGER GUMMI-WAREN COMPAGNIE, OF HAMBURG, GERMANY

CHLORINATION OF RUBBER

No Drawing. Application filed June 17, 1929, Serial No. 371,709, and in Germany April 14, 1928.

This invention is concerned with the chlorination of rubber and the manufacture of products therefrom.

One object of the invention is to provide stable unchangeable rubber chlorination products suitable for the manufacture of films, filaments coatings and the like.

A further object of the invention is to provide rubber chlorination products free from the defects which hitherto rendered them unsuitable for most purposes. Thus products heretofore obtained either by chlorinating rubber in swelling agents or solvents with cooling or without allowing the temperature to exceed 40–50° C. or by treating rubber in a solid or plastic condition with free chlorine, have, in spite of otherwise varying physical properties, all had this in common, that they decomposed when in the dry condition, hydrochloric acid splitting off.

According to the present invention a product with excellent properties, but without the defect of subsequently splitting-off hydrochloric acid, may be obtained by carrying out the chlorination of the dissolved rubber at temperatures of about 80° C. and over, the solution being first brought to this temperature and the chlorination then accomplished by introducing chlorine. Use is preferably made of such solvents as are not acted upon by chlorine, as for instance carbon tetrachloride and the like. In practice the best manner of working would appear to be to dissolve the rubber in, for example, carbon tetrachloride, heat the solution to approximately the boiling point of carbon tetrachloride and perform the chlorination in a reflux condenser. Chlorine is introduced so long as hydrochloric acid is still formed. The hydrochloric acid formed is removed completely and is not retained by the dissolved product. When the chlorination is finished, the product may be obtained by distilling off the solvent and may be further treated in any desired or appropriate manner. The solution obtained may, however, be employed direct for the production of coatings, films, filaments and so forth.

Cast on plane surfaces, the product may be dried, glass-clear, to perfectly flexible, soft, non-brittle films the properties and appearance of which may be modified to a considerable extent by the addition of softening agents, dyestuffs and the like. Such films are practically non-inflammable in contradistinction to films manufactured from cellulose esters, to which they are also superior moreover in respect of softness and elasticity. If they are ignited with a naked flame, then the part ignited goes out even after combustion has proceeded only a few millimetres. Similarly solutions of rubber chlorinated according to the present invention have proved to be excellent varnishes applicable by brushing or spraying and they are completely resistant towards both the strongest acids and the alkalies.

Furthermore the solution may have filaments with a silk like lustre formed from it by spinning in coagulation liquid, such as alcohol, benzine and so forth.

The films produced have no smell or taste, are wholly non-poisonous and are unaffected by water so that, apart from the purposes of the photographic, cinematographic and like arts, they are technically suitable for wrapping food, delicacies and so forth. The films are valuable for use for photographic and like purposes because they are absolutely incapable of being swollen in aqueous solutions and are wholly without reaction towards emulsions and the like.

It is to a certain extent remarkable that the process may also be applied to the chlorination of vulcanized rubber. It has been observed that the whole of the sulphur of the vulcanized rubber is separated out by the chlorine and appears as chloride of sulphur so that the vulcanized rubber is completely regenerated, although it does not appear as such because the regeneration is accompanied by simultaneous chlorination. Rubber products identical with or similar to those obtained by the chlorination of unvulcanized rubber are arrived at by the chlorination of vulcanized rubber at temperatures of about 80–110° C.

We claim:

1. Process for the chlorination of rubber, comprising dissolving the rubber in a solvent unaffected by chlorine, heating the solution to a temperature substantially within the range 80–110° C. and introducing chlorine into the heated solution.

2. Process for the chlorination of rubber, comprising dissolving the rubber in carbon tetrachloride, heating the solution to substantially the boiling point of carbon tetrachloride and treating said solution with chlorine in a reflux condenser until no further hydrochloric acid is formed.

3. Process for the manufacture of rubber chlorination products, comprising dissolving the rubber in a solvent unaffected by chlorine, heating the solution to a temperature substantially within the range 80–110° C., introducing chlorine into the heated solution, whereby the hydrochloric acid is evolved, and recovering from the solution the chlorinated rubber product.

4. Process for the manufacture of rubber chlorination products, comprising dissolving the rubber in a solvent unaffected by chlorine, heating the solution to a temperature substantially within the range 80–110° C., introducing chlorine into the heated solution, whereby hydrochloric acid is evolved, and producing directly from said solution desired chlorinated rubber goods, substantially as set forth.

Dr. MAX DESENISS.
Dr. ANDREAS NIELSEN.